United States Patent [19]

Kanai

[11] 4,104,159

[45] Aug. 1, 1978

[54] METHOD OF SEPARATION OF FLUORIDE ION FROM WATER

[76] Inventor: Masakuni Kanai, No. 1-5-601, Arai 1-chome, Nakano-ku, Tokyo-to, Japan

[21] Appl. No.: 761,557

[22] Filed: Jan. 24, 1977

Related U.S. Application Data

[63] Continuation-in-part of Ser. No. 544,544, Jan. 27, 1975, abandoned, which is a continuation-in-part of Ser. No. 305,758, Nov. 13, 1972, abandoned.

[51] Int. Cl.$^2$ .............................................. C02B 1/14
[52] U.S. Cl. ..................................... 210/28; 210/47; 210/51; 210/53; 210/DIG. 32; 204/149
[58] Field of Search ................. 204/149, 152; 210/24, 210/28, 42 R, 43, 45, 47, 51–53, 62, DIG. 32; 423/490

[56] References Cited

U.S. PATENT DOCUMENTS

| | | | |
|---|---|---|---|
| 2,531,451 | 11/1950 | Maier | 210/28 |
| 2,914,474 | 11/1959 | Hillyer et al. | 210/53 |
| 3,404,088 | 10/1968 | Dujardin | 210/44 |
| 3,414,497 | 12/1968 | Kanai | 204/149 |
| 3,551,332 | 12/1970 | Baumann et al. | 423/490 |
| 3,800,024 | 3/1974 | Forsell et al. | 210/42 |
| 3,926,753 | 12/1975 | Lee | 204/152 |

FOREIGN PATENT DOCUMENTS

| | | | |
|---|---|---|---|
| 775,143 | 5/1957 | United Kingdom | 210/42 |
| 261,996 | 5/1970 | U.S.S.R. | 210/42 |

Primary Examiner—Charles N. Hart
Assistant Examiner—Peter A. Hruskoci
Attorney, Agent, or Firm—Blum, Moscovitz, Friedman & Kaplan

[57] ABSTRACT

To remove fluoride from raw water, whether the fluoride is in solution as an ion or in the form of a colloidally-dispersed salt, calcium ions are first introduced into the water. The resultant calcium fluoride is adsorbed on a floc during passage of electric current through the raw water. The floc may be formed from organic matter already present in the raw water or from diatomaceous earth floc in a separate operation, the diatomaceous earth floc then being added to the raw water. Adsorption on floc whether originating in organic matter or in diatomaceous earth is facilitated by the passage of electric current through the raw water and by the addition of a surfactant.

22 Claims, 2 Drawing Figures

METHOD OF SEPARATION OF FLUORIDE ION FROM WATER

CROSS-REFERENCE TO RELATED APPLICATIONS

This is a Continuation-In-Part application of pending prior application Ser. No. 544,544, filed Jan. 27, 1975 now abandoned and having the title METHOD OF SEPARATION OF FLUORIDE ION FROM WATER, said prior application being itself a Continuation-In-Part application of pending prior application Ser. No. 305,758 filed Nov. 13, 1972 now abandoned and having the title METHOD OF SEPARATION OF FLUORIDE ION FROM WATER.

BACKGROUND OF THE INVENTION

This invention relates to an improved method for separating fluoride ion from an aqueous solution thereof and is particularly pertinent to the removal of fluoride ion when the concentration thereof is about 20 ppm or less, the method being effective for reducing the fluoride ion to a level as low as 0.20 ppm.

Conventional methods of removal of fluoride ion from raw water are expensive and ineffective where the fluoride ion concentration is 8 ppm or less. According to Hillyer et al in U.S. Pat. No. 2,914,474 the fluoride content of the effluent from a triple superphosphate plant can be reduced to as low as 8 parts per 1,000,000 by bringing the pH of the effluent to above 6.0 by the addition of calcium carbonate. In general, the fluoride content is reduced only to about 20 ppm but under optimum conditions can be brought to as low as 8 ppm. Kanai in U.S. Pat. No. 3,414,497 has taught the addition of $CaF_2$ to a polluted aqueous liquid and electrolysis thereof with specially-coated electrodes to clarify the solution. The positive electrode is coated with potassium compounds and compounds of silicon, barium, lead or calcium and the negative electrode is enclosed in a bag containing $F^-$ and $I^-$ compounds. It should be noted that the objective is to clarify the polluted water and not to remove fluoride from the solution. Further to this point, Kanai refers to the use of fluoride-releasing compounds such as sodium fluoride and lithium fluoride as alternatives to calcium fluoride.

Adamson in British Pat. No. 775,143 has taught a method of reducing the fluoride content from 24.5 ppm to 2.4 ppm or lower by boiling the water with a mixture of magnesium oxide or magnesium hydroxide with ammonium chloride. The reaction is rapid when the solution is boiled; however, such a procedure is prohibitively expensive where large quantities of water are to be treated. Adamson states that the process is effective even in the cold provided that a sufficiently long reaction period is allowed. Again, such a procedure can be impractical where large quantities of water are to be treated.

As is evident then, a practical method for reducing the fluoride content of water to an acceptable value is greatly to be desired. This is especially the case where expense is a significant factor and where the final fluoride content must be substantially below 1.0 ppm.

SUMMARY OF THE INVENTION

Generally speaking, in accordance with the method of the present invention, the first step is to bring the pH of the raw water to be treated to about 7 and to introduce calcium ion using an appropriate calcium compound. Where the pH is less than 7, CaO or $Ca(OH)_2$ is used. Where the solution is essentially neutral, any inexpensive calcium salt other than calcium fluoride can be used, the quantity added being at least stoichiometrically equivalent to all of the fluoride present which is uncombined with calcium and, preferably being in stoichiometric excess.

Calcium fluoride formed in the above step is adsorbed on a suitable floc while passing electric current through the solution. The floc may originate in an organic pollutant present in the raw water where the pollutant is of such a nature that it is fluoridized in the presence of fluoride ion during the passage of electric current through the solution, and provided the pollutant is present in sufficient quantity. Otherwise, a floc is prepared from diatomaceous earth by adding such diatomaceous earth to a separate solution containing an electrolyte such as magnesium chloride, ferric sulphate, aluminum chloride or alum. Passage of current through such a solution converts the diatomaceous earth to a floc which then can be added to the raw water. Passage of electric current through the raw water containing either type of floc results in rapid adsorption of fluoride, whether present in solution or as a colloidal dispersion of a fluoride-containing salt, on the floc.

Agglutination is facilitated by the addition of a small quantity of a surfactant such as soap to the raw water.

Removal of the floc with adsorbed fluoride results in a product containing vanishingly small quantities of fluoride.

Accordingly, an object of the present invention is a method for essentially complete removal of fluoride from raw water at low cost, said method being applicable to large-scale treatment of raw water.

Another object of the present invention is a method of virtually complete removal of fluoride from raw water using appropriate floc which can be prepared at low cost.

A further object of the present invention is a method of essentially complete removal of fluoride from raw water utilizing the passage of electric current through said raw water, a suitable floc and a surfactant to facilitate agglutination.

Still other objects and advantages of the invention will in part be obvious and will in part be apparent from the specification.

The invention accordingly comprises the several steps and the relation of one or more of such steps with respect to each of the others thereof, which will be exemplified in the method hereinafter disclosed, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

The effluent from industrial plants frequently is sufficiently high in fluoride content so that removal of fluoride from the water is necessary before the water can be disposed of. Moreover, while methods are available for reducing the fluoride content to approximately 20 parts per million without difficulty, convenient and inexpensive methods for reducing the fluoride content below 1 ppm on a large scale have hitherto not been available. The present method takes advantage of the low solubility of $CaF_2$ and solves the problem presented when said $CaF_2$ is present or precipitates in colloidally-dispersed form.

As the first step in the present process, where necessary, the pH of the raw water to be treated is brought to about 7, using either CaO or $Ca(OH)_2$. Where the pH is already at 7 or thereabouts, calcium is added as $CaCO_3$, $CaCl_2$, $CaSO_4$ or any other inexpensive calcium salt having a higher solubility than $CaF_2$. Preferably the quantity of calcium ion added is from 2 to 5 times the stoichiometric quantity needed to precipitate the fluoride ion because of the fact that the reaction at high dilution is relatively slow. Where the calcium ion is to be added as a relatively insoluble salt such as calcium carbonate, it can be added as slurry.

Figure 1:
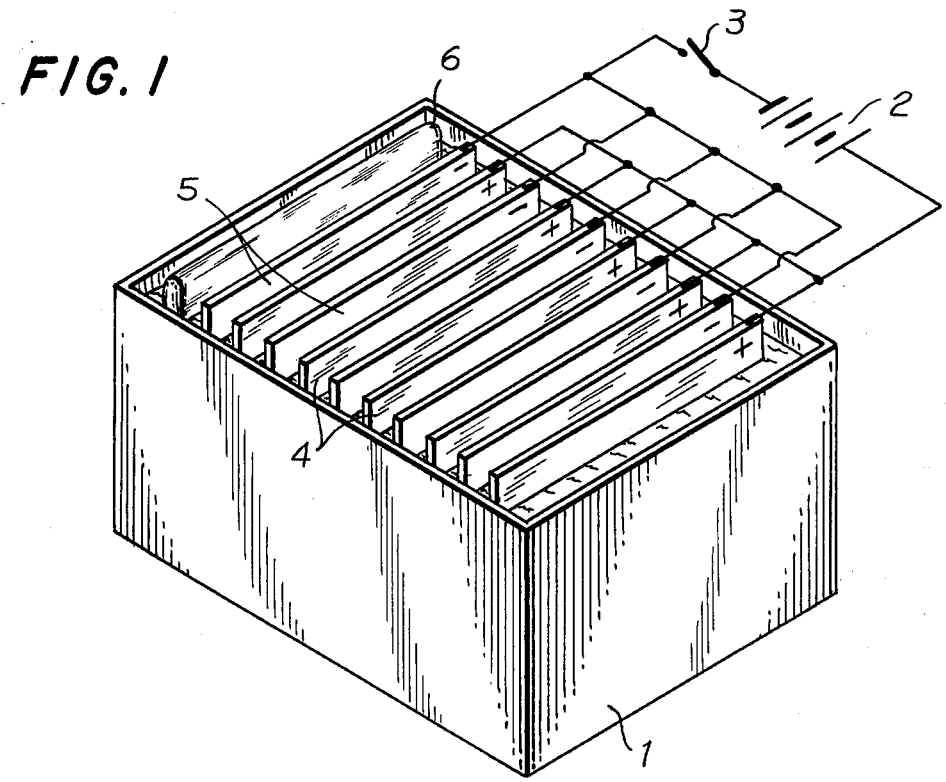
FIG. 1 is a view in perspective of an apparatus for converting diatomaceous earth into a floc suitable for adsorbing fluoride.

First taking the case where the quantity of organic pollutant reactive with fluoride ion in the raw water is relatively low, the second stage in the present process is to prepare electrolyzed diatomaceous earth. The preparation of electrolyzed diatomaceous earth is carried out in an apparatus as shown in FIG. 1 in which container 1 has therein positive plates 4 and negative plates 5 connected to a battery 2 through a switch 3. All of the positive plates in the container are connected in parallel as shown, and the negative plates are similarly connected in parallel. The spacing between adjacent plates is not critical and is conveniently between 7 and 11 cm. Preferably, the positive plates are of aluminum and the negative plates are of copper. However, both sets of plates can be of aluminum or can be of carbon, carbon being insensitive to most oxidation and reduction reactions. Container 1 also holds an activating electrolyte dissolved in water, typical activating electrolytes being $MgCl_2$, $Fe_2(SO_4)_3$, $AlCl_3$ and other soluble aluminum salts. The quantity of activating electrolyte added to the water is from about 0.1 g to 1.0 g per liter of water.

After dissolving the activating electrolyte in water, diatomaceous earth is added, the ratio of diatomaceous earth to activating electrolyte being in the range from about 5:1 to 50:1. The purpose of the addition is to convert the diatomaceous earth to a floc by passing current through the solution of the activating electrolyte, such a floc being strongly adsorbant for calcium fluoride. While the diatomaceous earth is readily converted to a floc when present in the range of ratios indicated, the conversion takes place more rapidly when the range of diatomaceous earth to activating electrolyte is from 15:1 to 25:1.

The current passed through the solution of activating electrolyte for converting the diatomaceous earth to floc may be expressed in either of two ways. Expressed on a volume basis, the current is conveniently between 7 and 50 $A/m^3$ of said solution. From the standpoint of rapidity of conversion, the current is preferably between 10 and 20 $A/m^3$ of solution.

The current may also be expressed in terms of current density, the current density being based on the total electrically-active area of the plates of one polarity. In the present process, a suitable range of current densities is between 0.1 and 10 $mA/cm^2$. For greatest speed of conversion and best quality of diatomaceous earth floc produced, the current density is preferably between 0.2 and 1.0 $mA/cm^2$.

As an indication of the rapidity with which the diatomaceous earth is converted to floc when treated as described, the time of electrolysis is generally between 10 and 90 minutes, it having been found that virtually no change takes place after 90 minutes. Preferably, the current density should be at a high enough value so that the time of electrolysis is held between 30 and 40 minutes.

Particularly where the positive electrode is of aluminum and the negative electrode is of copper, some attack on either or both of these electrodes may occur during the electrolysis. To minimize this attack, $CaF_2$, surprisingly, has been found to be effective. A convenient way of adding the requisite quantity of this compund to the solution is to suspend a porous bag as indicated by reference numeral 6 in FIG. 1 in the solution. Enough of the compound will be leached through the bag to protect the electrodes from attack.

Figure 2:
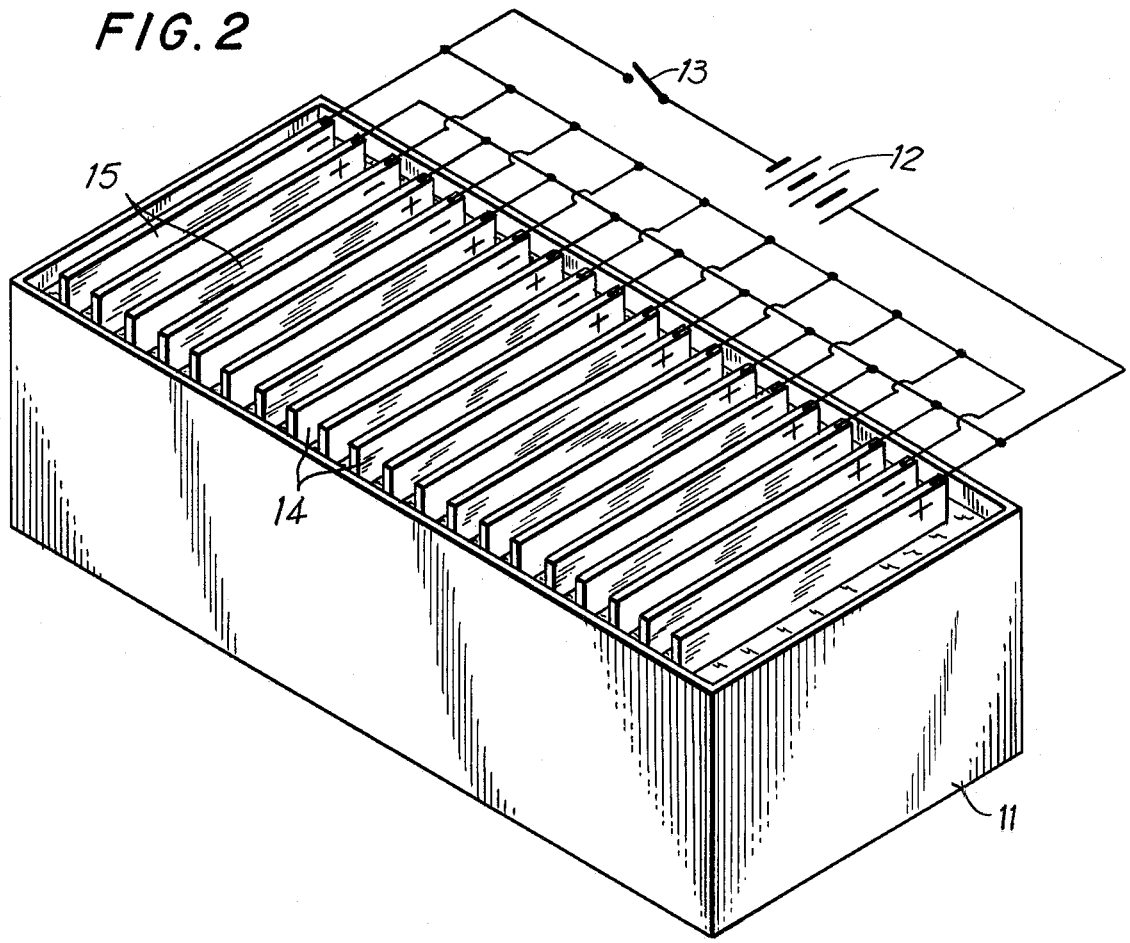
FIG. 2 is a view in perspective of an apparatus for passage of electric current through raw water and treatment of said raw water with an appropriate floc for the removal of fluoride from said raw water.

The range of voltage used in electrolyzing the diatomaceous earth is fundamentally dependent on the desired current or current density and the conductivity of the electrolyte. Where a relatively high concentration of activating electrolyte is used, then between 3 and 5 volts are sufficient. When the electrolyte concentration is low so that the resistance of the solution is relatively high, then the voltage may rise to as high as 10 volts. In general, it is preferable that the voltage imposed across the plates be above the decomposition voltage of $CaF_2$. This voltage is also higher than the decomposition voltage of the water in which the activating electrolyte is dissolved. Accordingly, both hydrogen and oxygen are generated, these gases tending to raise the floc to the surface of the solution upon which much of the floc floats as a scum. Some of the floc, due to its inherently high density sinks as a sludge. When the floc is to be used for adsorption of fluoride from raw water, it is preferably broken up by agitating the liquid and then poured as a suspension into the container 11 of FIG. 2 in which the raw water is to be electrolyzed. The floc tends to aggregate once more within the container and is effective for absorbing colloidal $CaF_2$ due to the fact that the floc which is essentially $SiO_2$ is negatively charged. Accordingly, it attracts positive ions to its surface.

Following are Examples illustrating the manufacture of the electrolyzed diatomaceous earth:

EXAMPLE 1

One gram of diatomaceous earth and 60 mg of $MgCl_2$ were added to 200 ml of water, and the resultant mixture was agitated to bring the salt into solution. Current at a volume density of 40 $A/m^3$ was passed through the solution for 40 minutes. The voltage necessary was 4.5 V.

As a result of the treatment, electrolyzed diatomaceous earth in the form of floc was formed. This floc was found to be effective in removing fluoride from raw water when added to the raw water in the ratio of 10 liters per cubic meter of raw water.

EXAMPLE 2

75 grams of diatomaceous earth and 3.75 grams of $Fe_2(SO_4)_3$ were added to 15 liters of water and the resultant mixture was agitated. Current was passed through the solution at a volume density of 20 $A/m^3$, the necessary voltage being 3V. The current was passed through the solution for 30 minutes. The electrolyzed diatomaceous earth formed large flocs.

EXAMPLE 3

150 grams of diatomaceous earth and 7.5 grams of $MgCl_2$ were added to 15 liters of water, and the resultant mixture was agitated. Current was passed through the solution at a volume density of 50 $A/m^3$ for 40 minutes, the voltage being 10 V. Again, the treatment resulted in the formation of large flocs of electrolyzed diatomaceous earth.

The method of adding the electrolyzed diatomaceous earth to raw water which, in turn, is to be electrolyzed is not critical. Conveniently, the floc, dispersed in electrolyte solution, may be added to an inlet (not shown) leading into container 11, said inlet also serving to introduce raw water into container 11. In practice, containers 1 and 11 may be connected by a conduit (not shown) and the electrolyzed diatomaceous earth introduced into container 11 through this conduit.

The quantity of electrolyzed diatomaceous earth, as a suspension of floc in the electrolyte, which need be added to raw water for the adsorption of fluoride therefrom will vary with the quality of the water. However, in general, the quanity of electrolyzed solution containing floc added to the raw water should range from about 5 liters to 100 liters per cubic meter of raw water. The most effective range is between 7 and 13 liters of electrolyzed solution containing floc per cubic meter of raw water. The actual quantity of diatomaceous earth as floc is then from about 35 to about 60 $grams/m^3$ of raw water and preferably from about 45 to 55 $g/m^3$ of raw water.

In addition to diatomaceous earth, it is desirable that a surfactant be combined with the raw water to facilitate adsorption of fluoride with the diatomaceous earth floc. Preferably, the surfactant is a soap. The soap employed may comprise a mixture of the sodium salts of palmitic, stearic and oleic acids. However, the soap may be sodium palmitate, sodium stearate or the like. The quantity of surfactants, which may also be referred to as an agglutinant, which should be added is between 0.01 and 0.5 $g/m^3$ of raw water and, preferably, between 0.05 and 0.2 $g/m^3$ of raw water.

The method of treatment of the raw water with added agglutinant and electrolyzed diatomaceous earth floc is quite similar to that in which the diatomaceous earth floc is prepared. Again, alternating positive plates 14 and negative plates 15 are connected in parallel to a battery 12 through a switch 13. The plates may be spaced between 5 and 9 centimeters apart. Current is passed through the raw water at a volume current density of 5 to 20 $A/m^3$ of raw water. The period of treatment can range between 10 and 90 minutes. Preferably the period of treatment is between 20 and 60 minutes. The current density may also be expressed in terms of the active electrode area, in which case it may be stated that the current density should lie between 0.1 and 10 $mA/cm^2$ of electrode, and preferably between 0.5 and 5.0 $mA/cm^2$ of electrode.

Where raw water, which may also be referred to as mother liquor, contains organic pollutants which can be "fluoridized" during passage of electric current, such compounds are transformed into floc by the replacement of hydroxyl or chlorine atoms with fluorine atoms. Under such conditions, such organic pollutant floc may substitute for part or all of the electrolyzed diatomaceous earth which would otherwise be added to the raw water. As when the diatomaceous earth floc is used, the pH should be brought to 7 and sufficient calcium added to combine with residual fluoride in the solution. Also, it is preferable to add an excess of calcium ions, based on the fluoride as yet uncombined with calcium.

The efficacy of the methods taught herein can be seen from the following Examples:

EXAMPLE 4

A 200 ml water sample was transferred to a beaker and 30 ppm of calcium carbonate, 50 ppm of electrolyzed diatomaceous earth and a trace amount of soap were introduced therein. The starting sample was assayed as set forth in the table below under the heading STARTING WATER.

A voltage of from about 6 to about 7 volts was impressed on the electrodes and a current of about 30 $amperes/m^3$ was conducted through the sample for about 1 hour.

The electrolyzed diatomaceous earth was prepared by electrolytically treating diatomaceous earth with magnesium chloride in a ratio of 20 parts of diatomaceous earth per part of magnesium chloride. The trace amount of soap was added to promote aggregation of colloidally suspended calcium fluoride.

TABLE 1

|  | Starting Water |  | Treated Water |  |
|---|---|---|---|---|
| pH | 6.4 |  | 7.8 |  |
| Transparency | 7.0 |  | 26.0 |  |
| $NH_4$ ion | 1.9 | ppm | 0.6 | ppm |
| $NO_3$ ion | 0 |  | 0 |  |
| Alkalinity, P | 0 |  | 0 |  |
| Alkalinity, M | 69 | ppm | 55.6 | ppm |
| COD | 20.4 | ppm | 3.7 | ppm |
| F | 1.0 | ppm | 0.2 | ppm |
| Fe | 2.3 | ppm | 0.01 | ppm |
| SS | 56 | ppm | 5.0 | ppm |
| F-Ss | 288 | ppm | 196 | ppm |
| Mn | 1.5 | ppm | 0.005 | ppm |
| Nitrous nitrogen | 0.02 | ppm | 0.03 | ppm |
| C | 6.0 | ppm | 6.1 | ppm |

EXAMPLE 5

The sample as described in Example 4 was continuously treated for the following additional periods of time with the following results. At the conclusion of the treatment, substantially all fluoride had been converted to calcium fluoride and the soap was observed to have a desirable aggregative effect on colloidally suspended calcium fluoride. An assay of fluoride ion content in the water was made at fifteen minute intervals during the period of treatment. Results of the sequence assays is set forth under the column "Treated Water," in Table 2 below.

TABLE 2

|  | Starting Water | Treated Water |  |
|---|---|---|---|
| 2 Hours' continuous treatment (floc formed after one hour's treatment was not removed). | 1.32 ppm | 0.19 | ppm |
|  |  | 0.20 | ppm |
|  |  | 0.20 | ppm |
| 3 Hours' continuous treatment (floc formed after 2 hours' treatment was not removed) | — | 0.12 | ppm |
|  |  | 0.14 | ppm |
|  |  | 0.10 | ppm |
| 4 Hours' continuous treatment (floc formed after 3 hours' treatment was not removed). | — | 0.0 | ppm |
|  |  | 0.02 | ppm |
|  |  | 0.002 | ppm |

EXAMPLE 6

| | Fluoride Ion Concentration | |
|---|---|---|
| | Original | After Treatment |
| Pure Water | 1.32 ppm | 0.32 ppm |

Data: $Al^+$ and $Cu^-$ electrodes
D.C. 5V, 50 ampere/$m^3$
$CaCO_3$ (20g/$m^3$) and diatomaceous earth (40g/$m^3$) are added.

EXAMPLE 7

| | Fluoride Ion Concentration | |
|---|---|---|
| | Original | After Treatment |
| Drainage | 15.4 ppm | 0.44 ppm |

Data: $Al^+$ and $Cu^-$ electrodes
D.C. 5V, 50 ampere/$m^3$
$CaCO_3$ (20g/$m^3$) and diatomaceous earth (40g/$m^3$) are added.

It is thus seen that the fluoride ion concentration of a raw aqueous sample may be reduced to 0.20 ppm or less according to the instant method. Moreover, the method is substantially equally effective without regard for the initial fluoride ion concentration in the sample. In other words, only trace amounts of fluoride ions remain in the sample after treatment, whether the initial starting concentration thereof exceeds 10 ppm or does not initially exceed 1.50 ppm. It is therefore believed, that the instant method has particular utility where the initial fluoride ion concentration therein is low. Other fluoride ion removal methods have been found unsatisfactory or impracticable where the initial fluoride ion concentration is 8 ppm or less.

It will thus be seen that the objects set forth above, among those made apparent from the preceding description are efficiently attained and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

What is claimed is:

1. A method of removing fluoride from raw water where said fluoride is present in solution or as a colloidally-dispersed salt, comprising the steps of preparing electrolyzed diatomaceous earth by the substeps of dissolving in water an activating electrolyte taken from the group consisting of $MgCl_2$, $Fe_2(SO_4)_3$, $AlCl_3$ and alum, adding diatomaceous earth to the resultant solution in an amount from 0.5 to 50 g/l, and electrolyzing said solution by passing current through said solution at a volume current density of 7 to 50 A/$m^3$ to convert said diatomaceous earth to a floc, adding at least a stoichiometric quantity of calcium ion to said raw water as based on fluoride uncombined with calcium, said calcium ion being added as the oxide or hydroxide in quantity sufficient to bring the pH of said raw water to about 7 when the pH is less than 7 and otherwise as a member of the group consisting of $CaCO_3$, $CaCl_2$ and $CaSO_4$; adding said diatomaceous earth floc in said electrolyzed solution to said raw water in an amount from 5 to 100 liters of electrolyzed solution per 1000 liters of raw water subsequent to said addition of calcium ion and passing electric current through said raw water at a volume current density of 5 to 20 A/$m^3$ until virtually all of said fluoride is converted to $CaF_2$ and adsorbed on said floc.

2. The method as defined in claim 1, further comprising the step of adding to said raw water an amount of a surfactant effective for accelerating adsorption of said $CaF_2$ on said floc.

3. The method as defined in claim 2, wherein the quantity of surfactant added is between 0.01 and 0.5 g/$m^3$ of raw water.

4. The method as defined in claim 2, wherein the quantity of surfactant added is between 0.05 and 0.2 g/$m^3$ of raw water.

5. The method as defined in claim 1, wherein the quantity of activating electrolyte added to said water is from about 0.1 g to 1.0 g per liter of water.

6. The method as defined in claim 1, wherein the ratio of diatomaceous earth to activating electrolyte added to said water ranges from about 50:1 to 5:1.

7. The method as defined in claim 1, wherein the ratio of diatomaceous earth to activating electrolyte added to said water ranges from about 25:1 to 15:1.

8. The method as defined in claim 1, wherein the quantity of electrolyzed solution containing floc added to said raw water is in the range of ratios between 7:1000 and 13:1000.

9. The method as defined in claim 1, wherein the volume current density used in electrolyzing said solution in converting diatomaceous earth to floc is between 10 and 20 A/$m^3$.

10. The method as defined in claim 1, wherein the current density used in electrolyzing said solution in converting diatomaceous earth to floc is between 0.1 and 10 mA/$cm^2$ of electrode.

11. The method as defined in claim 1, wherein the current density used in electrolyzing said solution in converting diatomaceous earth to floc is between 0.2 and 1.0 mA/$cm^2$ of electrode.

12. The method as defined in claim 1, wherein the time of electrolyzing said solution is between 10 and 90 min.

13. The method as defined in claim 1, wherein the time of electrolyzing said solution is between 30 and 40 min.

14. The method as defined in claim 1, wherein said electrolyzing of said solution is effected by means of a positive electrode of aluminum or carbon and a negative electrode of aluminum, copper or carbon.

15. The method as defined in claim 14, further comprising the step of adding $CaF_2$ to said solution to be electrolyzed, said $CaF_2$ being added for minimizing chemical attack on said electrodes.

16. The method as defined in claim 14, wherein said electrodes of opposite polarity are spaced apart by a distance between 7 and 11 cm.

17. The method as defined in claim 1, wherein the period during which current is passed through said raw water for removal of fluoride is between 10 and 90 minutes.

18. The method as defined in claim 1, wherein the current density passed through said raw water for removing fluoride is between 0.1 and 10 mA/$cm^2$ of electrode.

19. The method as defined in claim 1, wherein the current density passed through said raw water for removing fluoride is between 0.5 and 5.0 mA/cm$^2$ of electrode.

20. The method as defined in claim 1, wherein the quantity of fluoride in said raw water is between 1.0 and 20 ppm.

21. The method as defined in claim 1, wherein the quantity of diatomaceous earth as floc added to said raw water is from 35 to about 60 g/m$^3$.

22. The method as defined in claim 1, wherein the quantity of diatomaceous earth as floc added to said raw water is from about 45 to about 55 g/m$^3$.

* * * * *